United States Patent Office 2,938,934
Patented May 31, 1960

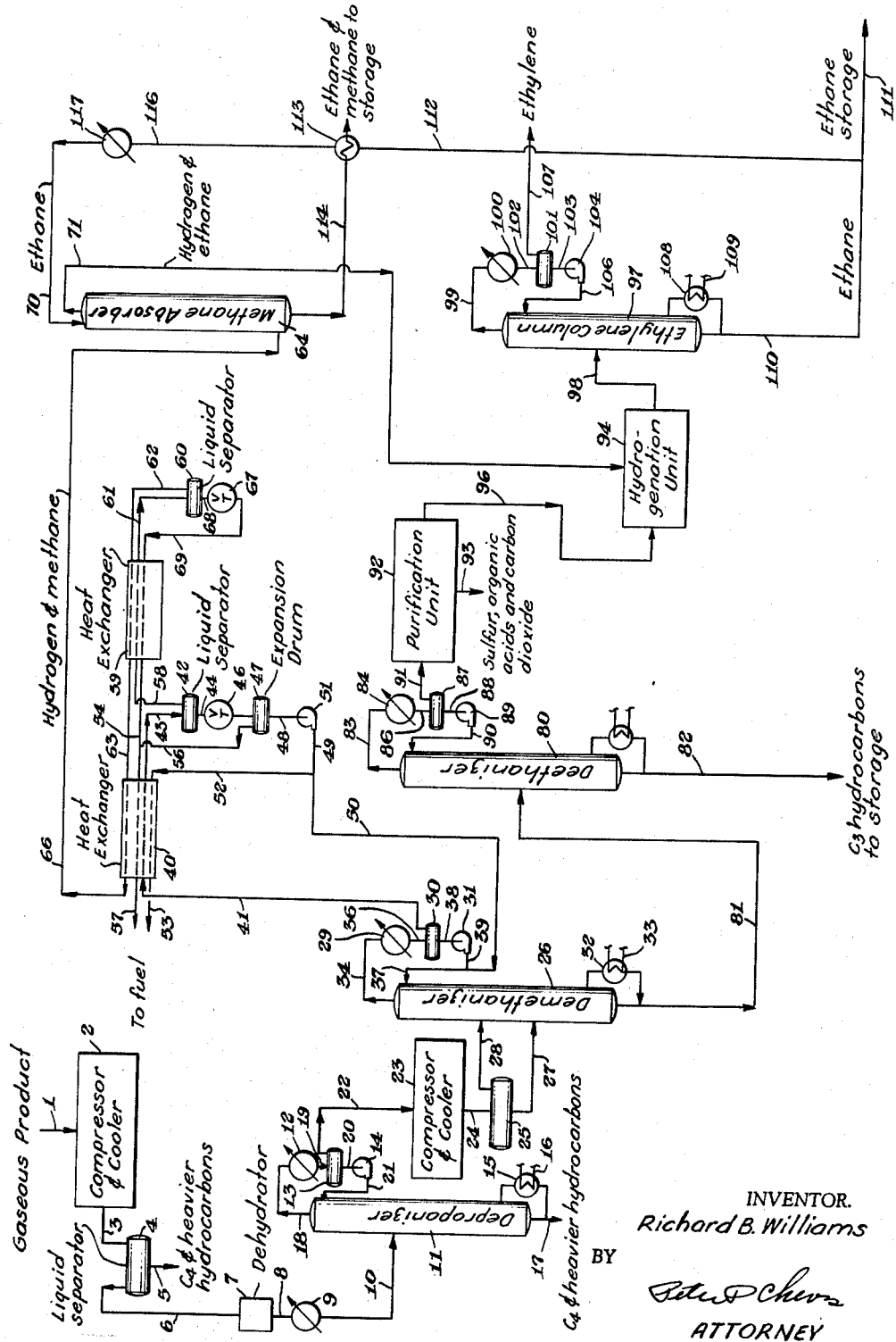

2,938,934

PROCESS FOR RECOVERY OF ETHYLENE

Richard B. Williams, Freeland, Mich., assignor to The Dow Chemical Company, Midland, Mich., a corporation of Delaware Filed June 4, 1958, Ser. No. 739,840

3 Claims. (Cl. 260—677)

This invention relates to a method of treating normally gaseous components for the recovery of ethylene therefrom.

More specifically this invention involves a novel combination of cooperative steps for treating a mixture of normally gaseous components to recover and purify ethylene contained in the mixture. It comprises the steps of separating light gaseous fractions from heavier components by partial liquification and solution at low temperatures, purification of selected fractions, and low temperature fractionation under elevated pressures with a resulting more efficient separation and recovery of ethylene as a substantially pure fraction.

The invention is particularly applicable to hydrocarbon mixtures which are principally gaseous and which may result from a cracking process for the production of normally gaseous unsaturated hydrocarbons. It is not intended to limit the invention, however, to any particular mixture or gas stream, for the present method of operation is applicable to hydrocarbon mixtures containing small amounts of normally liquid as well as normally gaseous constituents, such as petroleum refinery gases, which contain hydrogen and relatively close boiling point components such as methane, ethylene, acetylene, ethane, propylene, propane and other heavier constituents.

Because of its reactivity, the demand for ethylene is increasing as a raw material for the manufacture of an extremely wide variety of synthetic chemical products, fuels, and lubricants. Ethylene is available in refinery gases and also can readily be produced by pyrolysis of saturated hydrocarbons. In the refinery gases and in the gaseous products obtained from pyrolysis of hydrocarbons, ethylene is combined in a mixture of other normally gaseous constituents, such as hydrogen, methane, acetylene, ethane, propylene, propane and others having a higher boiling point, from which it is difficult to separate. It is, therefore, a principal object of this invention to provide an improved method for the recovery of ethylene, as a substantially pure fraction, from gaseous mixtures containing other closely boiling hydrocarbon components. A further object is to provide an improved method for recovery of the hydrogen from these gaseous mixtures in relatively pure state so that it may be used in the hydrogenation of the acetylene which the mixture contains.

The invention provides a process for treating normally gaseous mixtures containing ethylene and lower and higher boiling point gaseous compounds including hydrogen and acetylene to recover a substantially pure ethylene fraction. The process comprises partially liquifying and cooling the gaseous mixture, as by compression and cooling, and then subjecting it to depropanization to separate the $C_4$ hydrocarbons and other components having a higher boiling point than the $C_4$ hydrocarbons from the gaseous mixture. Upon separation of the $C_4$ hydrocarbons, the gas mixture is partially liquified, as by further compression and cooling, and subjected to demethanization where methane and the components of the mixture having lower boiling points than methane, such a hydrogen, are removed. The demethanized mixture is then deethanized to remove the $C_3$ hydrocarbons and a gaseous mixture comprising essentially ethane, ethylene, and acetylene is obtained. This gas mixture is purified to remove undesirable impurities, such as sulfur compounds, organic acids, and carbon dioxide, after which it is hydrogenated to convert the acetylene that it contains to ethylene. After the hydrogenation of the gas mixture, it is fractionated in an ethylene column wherein the ethylene is separated as a substantially pure fraction from the ethane and remaining heavier components. The hydrogen used in the hydrogenation is obtained by recovering it from the methane-hydrogen mixture obtained during the demethanization by partial liquification and cooling of the methane-hydrogen mixture resulting from adiabatic expansion of the mixture. By the adiabatic expansion, a predominantly hydrogen fraction is obtained which is further purified by absorption of the methane by contacting the fraction with ethane coming from the ethylene fractionation column.

The advantages of the present invention will be more apparent from the description of the process in reference to the accompanying drawing in which a schematic flow diagram of the process is shown.

In carrying out the invention a gaseous product, such as coming from a thermal cracking unit after being cooled, is passed through line 1 into a compressor and cooler system 2. The gaseous product being charged to the compressor-cooler generally comprises normally gaseous constituents, having boiling points close together, such as hydrogen, methane, ethylene, acetylene, ethane, propylene, propane and other normally gaseous compounds as well as some constituents heavier than $C_4$ hydrocarbons which would be normally considered as liquids. Upon compression and cooling of the gaseous product the major portion of the hydrocarbons heavier than $C_4$ are liquified as well as some of the $C_4$ hydrocarbons. Since the gaseous product generally contains butadienes and other unsaturated $C_4$'s, it is preferred to compress the product only to a pressure in the range of 2 to 3 atmospheres, since some polymerization of the unsaturated $C_4$ hydrocarbons may be obtained if higher pressures are used. Generally, a single stage compressor is used, but more stages and higher pressures may be used, if desired. The compressed product is usually cooled to a temperature of around 30 to 60° F. to liquify the major portion of the $C_4$ and heavier hydrocarbons before being discharged by line 3 to a liquid separator 4 where the partially condensed fraction is separated from the unliquified fraction and is withdrawn from the separator through line 5.

The unliquified fraction from the liquid separator 4 is passed by means of line 6 to a dehydrator 7 which may be a solid bed type containing alumina, silica gel, or other well known dehydrating agents. From the dehydrator, the dried gas is passed by line 8 to a cooler 9 where the fraction is generally partially liquified. A refrigerated cooling medium or refrigeration, such as vaporization of propane, may be used in precooler 9 to cool this fraction to a temperature which is generally below 0° F. to liquify a substantial portion of the fraction. After the gas fraction is precooled and partially liquified, it is charged by means of line 10 to a depropanizer 11. The depropanizer may be a conventional fractionation tower having a reflux condenser 12, liquid separator 13, reflux pump 14 and a reboiler 15 having a heating coil 16 through which a heating medium may be passed.

In the depropanizer the fraction is subjected to fractionation under refluxing conditions such that substantially all of the $C_4$ hydrocarbons and all of the other components having a boiling point higher than the $C_4$ hydrocarbons are separated from the gaseous product and withdrawn as a liquid stream from the bottom of the tower through line 17. This stream may be further fractionated (not shown) to separate the different constituents it contains. The overhead product obtained from the depropanizer comprises substantially all of the $C_3$ hydrocarbons and lighter constituents. These constituents leave the depropanizer as an overhead fraction and are passed to a reflux condenser 12 by means of line 18. The overhead fraction is cooled in the reflux condenser, partially liquified, and discharged through line 19 to a reflux liquid separator 13. In separator 13 the liquified fraction of the overhead product is separated from the vapor fraction and pumped back to the tower as reflux by means of reflux pump 14 and lines 20 and 21. In reflux condenser 12, refrigeration or a refrigerated cooling medium is used and the overhead from the depropanizer is sufficiently cooled to condense enough of the fraction to supply the required reflux. It is apparent that the reflux temperature required in the depropanizer as well as in other fractionation columns hereinafter described will depend upon the pressure employed in the column and the actual compositions of the stream fractioned. However, since in the depropanizer a pressure in the range of 2 to 3 atmospheres is preferred, under this pressure generally the reflux condenser is operated at a temperature below −60° F. but will vary with the composition of the overhead fraction.

The gaseous fraction from separator 13 will be substantially free of $C_4$ and heavier hydrocarbons. It is withdrawn from separator 13 and further fractionated, after partial liquification, by additional compression and cooling. This fraction is charged through line 22 to compressor-cooler unit 23 where it is generally compressed to about 20 to 40 atmospheres pressure, preferably about 30 atmospheres. A multistage compression unit is most often used where the compressed gas is cooled between stages and preferably finally cooled to a temperature of about 10° F. or below before being discharged by line 24 to a liquid separator 25 where the liquified fraction and gaseous fraction resulting from the compression and cooling are separated. Upon separation of these fractions, they are charged separately into a demethanizer 26 through line 27 and 28 respectively.

In the demethanizer the stream is fractionated under super atmospheric pressure to remove the methane and lower boiling constituents, such as hydrogen, as a gaseous fraction from the remainder of the constituents. The demethanizer may be a conventional fractionation tower equipped with a reflux condenser 29, reflux liquid separator 30, reflux pump 31, and a reboiler 32 having a heating coil 33. In the demethanizer the overhead product is passed by line 34 to reflux condenser 29 where the overhead fraction is partially liquified and discharged through line 36 into the reflux liquid separator 30. A refrigerated medium is utilized in reflux condenser 29 to obtain sufficiently low temperatures to maintain the unliquified portion of the overhead as a substantially hydrogen and methane fraction. The liquified portion of the demethanizer overhead product which is separated from the uncondensed portion in reflux separator 30 is discharged by means of reflux pump 31 and lines 37, 38, and 39 into the top of the demethanizer as reflux. The gaseous fraction from reflux liquid separator 30 comprises essentially methane and hydrogen having only a small amount of ethylene and heavier constituents as normally encountered in fractionation.

The gaseous fraction of essentially methane and hydrogen obtained from the reflux liquid separator 30 is adiabatically expanded to effect a separation between the hydrogen and the methane. The gaseous fraction from the demethanizer is passed to heat exchanger 40 by means of line 41. In heat exchanger 40, the hydrogen and methane are cooled, partially liquifying the stream. From the exchanger the cooled and partially liquified stream is discharged into liquid separator 42 through line 43. Due to the lower volatility of the methane, the portion of the stream liquified by passing through heat exchanger 40 will contain a substantial portion of the methane, ethylene, and any other higher boiling constituents which may have been in the gaseous fraction leaving the demethanizer. The unliquified portion will contain substantially all of the hydrogen and some of the methane. The cooling to effect a partial condensation of the hydrogen and methane in heat exchanger 40 is obtained by the adiabatic expansion of the liquified portion obtained by cooling of the hydrogen-methane fraction in heat exchanger 40. The liquified portion in separator 42 is passed through line 44 which contains a throttling valve 46 and the pressure on the liquid is substantially reduced, to about 2 to 4 atmospheres, and discharged into expansion drum 47. Due to the Joule-Thomson effect in the adiabatic expansion, a decrease in temperature is obtained and part of the mixture remains as a liquid in drum 47 even at the decreased pressure. A major portion of the liquid from the expansion drum 47 is returned as reflux to the demethanizer by means of lines 48, 49, 50 and pump 51. The remaining portion of the liquid is by-passed through heat exchanger 40 by means of line 52 where in the exchanger the liquid is allowed to vaporize and supply a part of the cooling necessary in heat exchanger 40. From heat exchanger 40, the gasified fraction is discharged by means of line 53 to fuel. The vapor from the expansion drum 47 is also passed through heat exchanger 40. The vapor from the expansion drum is discharged into line 54 by means of line 56 where it passes to heat exchanger 40 and the sensible heat of the stream is used in the heat exchanger in aiding to cool the hydrogen and methane fraction coming from the demethanizer. After passing through heat exchanger 40, this gas fraction which consists essentially of methane is passed to fuel by line 57.

The portion of the hydrogen and methane fraction coming from the demethanizer which is not liquified when it is passed through heat exchanger 40 is removed from the liquid separator 42 by means of line 58 and then passed through another heat exchanger 59 where it is further cooled and partially liquified. Upon passing through heat exchanger 59, the partially liquified stream is discharged into liquid separator 60 through line 61. In liquid separator 60 the unliquified portion is withdrawn by line 62 and passed through heat exchanger 59 to aid in the cooling and liquification of the gaseous fraction coming from liquid separator 42. From heat exchanger 59 the gaseous fraction is passed to heat exchanger 40 by means of line 63 and after passing through heat exchanger 40 to a methane absorber 64 by means of line 66. The liquid fraction in the liquid separator 60 is adiabatically expanded by use of a throttling valve 67 located in line 68 whereby the pressure on the liquid is reduced to about 2 to 4 atmospheres and a decrease in temperature is effected. Upon the pressure reduction the liquid fraction, partially vaporized, is passed to exchanger 59 by means of line 69. After passing through heat exchanger 59 where it becomes totally vaporized, it is passed to heat exchanger 40 by means of line 54 and discharged to fuel after passing through heat exchanger 40 by line 57.

The separation of hydrogen and the recovery of the ethylene from the hydrogen-methane stream coming from the demethanizer is effected without the expenditure of additional energy. By employing adiabatic expansion or the Joule-Thomson effect sufficient cooling is obtained by the adiabatic expansion to provide the necessary cooling and effect the separation of the hydrogen from the methane. Since the volatility of the hydrogen is considerably greater than that of methane, a two-stage partial condensation as shown in the drawing is sufficient to obtain a hydrogen stream containing less than 20 mole percent methane which is of sufficient hydrogen content for hydrogenation. If desired, a hydrogen stream containing a higher percentage of hydrogen may be obtained by employing more than two stages. When the demethanizer is operated at around 30 atmospheres pressure, the overhead product from the demethanizer is generally cooled in reflux condenser 29 to a temperature in the range of −140° F. Thus, the hydrogen and methane fraction coming from the demethanizer is at approximately −140° F. and upon passing through heat exchanger 40 may be cooled to a temperature of around −170° F. At this temperature in liquid separator 42, the gaseous portion obtained will comprise approximately 60 mole percent hydrogen and 40 mole percent of methane. The temperature of this gas fraction leaving liquid separator 42 may be further lowered in heat exchanger 59 to a temperature of around −220° F. This cooling will give an uncondensed gaseous fraction of hydrogen containing less than 20 mole percent methane which may then be charged to methane absorber 64. By adiabatic expansion of the liquified portions using throttle valves 67 and 46, temperatures as low as −225° F. may be obtained to supply the required cooling.

In the methane absorber the hydrogen fraction is contacted with liquid ethane wherein the methane is absorbed and a gaseous stream containing hydrogen and ethane is obtained. The absorber may be a packed column, baffle plate, and the like, all of which are well known in the art. The hydrogen stream is introduced into the stripping column at the bottom is introduced into the stripping column at the bottom and passes up the column contacting the ethane which is introduced at the top through line 70. The hydrogen containing ethane is discharged from the top of the absorber and passed to a hydrogenation unit through line 71. The liquid ethane charged at the top proceeds down the absorber and the portion that is not carried out with the hydrogen is discharged from the bottom of the absorber containing the methane that it removed from the hydrogen stream. The absorber is operated at a super atmospheric pressure being less than the pressure employed in the demethanizer by the pressure drop obtained in the heat exchangers and adiabatic expansion equipment.

After the removal of substantially all of the methane and hydrogen in the demethanizer, the stream is discharged as liquid bottoms from the demethanizer and fed to a deethanizer 80 through line 81. The deethanizer is operated at a pressure lower than the demethanizer, for example 15 to 18 atmospheres, and thus the demethanizer fraction from the demethanizer may be passed to the deethanizer without any pumping. The demethanizer fraction charged to the deethanizer 80 is subjected therein to fractionation under reflux conditions, such that a $C_3$ hydrocarbon fraction substantially free from ethylene, acetylene, and ethane, is separated from the lower boiling gaseous fraction and is withdrawn through line 82 from the lower end of the column, while the lower boiling gaseous fraction, consisting essentially of the ethane and lighter components, is discharged from the upper end of the column 80 through line 83 to condenser 84. The gaseous stream is partially condensed in reflux condenser 84 and is passed through line 86 into reflux liquid separator 87 wherein the liquid and gaseous fractions are separated to provide a reflux stream and a gaseous discharge stream. The liquid reflux stream is withdrawn from separator 87 through line 88 and passed to pump 89 from which it is discharged through line 90 into the top of the deethanizer to provide the reflux. The gas fraction from separator 87, consisting largely of acetylene, ethylene and ethane, is passed by way of line 91 to a gas purification unit 92 where sulfur compounds, organic acids, and carbon dioxide, are removed. The gas purification treatment may include Girbotal-treating, caustic wash, mercaptan extraction, and the like, all of which are well-known in the refining art. The sulfur compounds and organic acids and the like are removed from the gas fraction and discharged to waste through line 93, while the purification gas is passed to a hydrogenation unit 94 through line 96, wherein the acetylene is hydrogenated to ethylene and other higher molecular weight compounds than ethylene. The hydrogenation may be effected in the presence of a suitable hydrogenating catalyst, such as platinum, palladium supported on silicon, or other known catalyst may be used. The hydrogen utilized in the hydrogenation unit is obtained from the stripper through line 71.

After the hydrogenation of the acetylene in the stream, the stream is passed to an ethylene column 97 through line 98 where the stream is subjected to fractionation under sufficient pressure to separate the ethylene from the ethane and other heavier components without having to employ too low a reflux temperature. Usually the ethylene column is operated at a pressure in the range of 10 to 15 atmospheres, being sufficiently less than the pressure in the deethanizer to overcome the pressure drop in the purification and hydrogenation unit. In the ethylene column, an ethylene fraction is discharged from the top of the column through line 99 to condenser 100 where the fraction is partially condensed and passed to separator 101 through line 102. In separator 101 the liquid fraction is separated from the gaseous fraction and is withdrawn from separator 101 through line 103 and pumped by means of pump 104 to the top of the tower through line 106 to serve as reflux for the tower. The gaseous fraction obtained from separator 101 is substantially pure ethylene which is passed by means of line 107 to storage or to another part of the process, not shown, where it can be compressed, condensed, and returned back to the process to be used as a refrigerant, for example in reflux condenser 29 of the demethanizer. The ethylene tower is equipped with a reboiler 108 having heating coil 109 through which heating medium may be passed to partially vaporize the liquid in the reboiler and provide the required fractionation in the tower. The remaining fraction after the removal of the ethylene in the ethylene tower which comprises substantially ethane is removed from the ethylene tower as a liquid through line 110. Part of the ethane is passed by line 111 to storage, while a fraction of the ethane is passed to methane stripper 64 by line 112 where it is precooled in cooler 113 against the ethane and methane stream coming from the methane stripper by means of line 114. The precooled ethane is then passed by means of line 116 to a second cooler 117 where the ethane is further cooled before being discharged into the stripper. In cooler 117 a refrigerated medium or refrigerant may be used to cool the ethane to a temperature generally below −100° F. so that the methane stripper may be operated at a low temperature.

For simplification of the drawing and of the following description, conventional equipment such as control instruments for observing and controlling temperatures, pressures, and liquid levels and the like, are not indicated or described specifically. Also, though not shown, a series of refrigerated cooling mediums or the fractions obtained, such as ethylene and ethane from ethylene column 80 and the $C_3$ hydrocarbon from the deethanizer, may be cooled and vaporized and used as refrigerants in the reflux condensers and other coolers, such as 9 and 117, in the process. It is desirable to use a series of cooling mediums or refrigerants, since different temperatures are required in different parts of the process. For example, in the deethanizer a temperature in a range of −20° F. may be required and a propane refrigeration system or cooling medium would be sufficient, while for the demethanizer a temperature as low −140° F. may be required and an ethylene refrigeration system would be desirable.

While the process of this invention is applicable to the separation and recovery of ethylene from any gas stream containing ethylene, acetylene, and hydrogen and other gaseous compounds whose boiling points are close together, it is particularly applicable to the recovery of ethylene from gaseous products of hydrocarbon pyrolysis units. In a cracking unit, the amount of hydrogen necessary in the hydrogenation of acetylene is relatively small and it is uneconomical to maintain a hydrogen plant for this purpose. Generally in refinery gases or a gaseous stream obtained from pyrolysis units, the gas contains more than enough hydrogen for the hydrogenation of the acetylene in the stream. By the process of the invention, the hydrogen in the gas stream is recovered and used in the hydrogenation of the acetylene without any further expenditure of energy with the excess hydrogen being available for other uses. By removing a fraction consisting substantially of hydrogen and methane by the operation of the demethanizer and then cooling this stream by adiabatic expansion, a hydrogen stream containing minor amounts of methane is obtained. The methane is removed from the hydrogen stream by ethane absorption so that the methane would not be added to the gas stream containing ethylene, acetylene, and ethane in the hydrogenation unit. When the hydrogen stream containing ethane is employed in the hydrogenation, the presence of ethane will not contaminate the ethylene, since the ethane will be removed upon fractionation of the stream leaving the hydrogenation unit in the ethylene column.

While the drawing and foregoing description has outlined a preferred and specific embodiment of the invention and certain alternative modes of operation thereof, other modifications may be made in the details of operation and in the arrangement of the apparatus therefor without departing from the spirit and scope of the invention. For example, the cooled gaseous product coming from the pyrolysis or thermal cracking unit of saturated hydrocarbon for the production of unsaturated hydrocarbons through line 1 may be compressed in compressor cooler unit 2, dehydrated, and then charged directly into the depropanizer 11 without being directed to liquid separator 4 to separate the liquified fraction from the unliquified fraction. By discharging the compressed and cooled product to liquid separator 4, a preliminary separation is made and the heavier hydrocarbons are removed thus decreasing the size of the depropanizer necessary to make the final separation of removing the $C_4$ and heavier hydrocarbons. Also the gaseous fraction leaving liquid separator does not have to be cooled and partially liquified by use of a cooler 9. However, by partially liquifying the fraction in cooler 9, the reflux load in the depropanizer is decreased.

What is claimed is:
1. A process for treating a gaseous mixture containing ethylene and lower and higher boiling normally gaseous components including acetylene and hydrogen to recover ethylene as a substantially pure fraction, which comprises partially liquifying and cooling said mixture, subjecting said partially liquified mixture to depropanization to separate the $C_4$ hydrocarbons from the mixture and produce a depropanizer overhead mixture, partially liquifying the depropanizer overhead mixture by compression and cooling, subjecting the resulting partially liquified and cooled mixture to demethanization to separate the hydrogen and methane as a gaseous fraction from ethylene and other gaseous components having a boiling point above ethylene, cooling the hydrogen and methane fraction so as to successively partially liquify the fraction, separating the successively liquified portions from the unliquified portions and releasing the pressure on the liquified portions to adiabatically expand said portion to provide cooling for the successive partial liquification of the methane-hydrogen fraction until a substantial proportion of the methane is liquified leaving a gaseous fraction of predominantly hydrogen, contacting the gaseous fraction of predominantly hydrogen with ethane coming from a following step in the process to absorb the major portion of the methane from the hydrogen, charging the hydrogen to a following hydrogenation step in the process to hydrogenate the acetylene, subjecting the ethylene and gaseous components boiling above ethylene obtained from the prior demethanization step to deethanization so as to separate ethane and the lower boiling components from the $C_3$ hydrocarbons, treating the ethane and the lower boiling components to remove sulphur compounds and organic acid impurities, subjecting the so purified stream to hydrogenation to hydrogenate the acetylene in the stream to ethylene using hydrogen obtained in the process, subjecting the stream after hydrogenation to fractionation to separate the ethylene as a substantially pure fraction from the ethane, and returning a portion of the ethane for the absorption of the methane from the predominantly hydrogen fraction.

2. A process according to claim 1 wherein the gaseous mixture is a gaseous product of hydrocarbon pyrolysis.

3. A process for treating a gaseous product of hydrocarbon pyrolysis containing ethylene and lower and higher boiling normally gaseous components including acetylene and hydrogen to recover ethylene as a substantially pure fraction, which comprises compressing said mixture to from 2 to 3 atmospheres pressure, cooling the compressed mixture to partially liquify it, separating the unliquified fraction from the liquified fraction, subjecting the unliquified fraction to depropanization to separate the $C_4$ hydrocarbons from the fraction and produce a depropanizer overhead fraction, partially liquifying the depropanizer overhead fraction by compressing the fraction to from 20 to 40 atmospheres, cooling the compressed fraction to partially liquify it, subjecting the resulting partially liquified debutanized fraction to demethanization to separate the hydrogen and methane as a gaseous fraction from ethylene and other gaseous components having a boiling point above ethylene, cooling the hydrogen and methane fraction so as to partially liquify the fraction, separating the liquified portion from the unliquified portion and releasing the pressure on the liquified portion to adiabatically expand said portion to provide the cooling for partial liquification of more methane-hydrogen fraction, cooling the unliquified portion so as to liquify a substantial part of the methane in said unliquified portion as a liquid fraction leaving a gaseous fraction comprising predominantly hydrogen, said cooling being obtained by adiabatic expansion of a previously obtained liquid fraction by cooling of a previous unliquified portion, separating the predominantly hydrogen gaseous fraction from the liquid fraction, releasing the pressure on the liquid fraction so as to adiabatically expand it to cool and liquify a substantial part of the methane in additional unliquified portion, contacting the unliquified fraction of predominantly hydrogen with ethane coming from a following step in the process to absorb the major portion of the methane from the hydrogen, charging the hydrogen to a following hydrogenation step in the process to hydrogenate the acetylene, subjecting the ethylene and gaseous components boiling above ethylene obtained from the prior demethanization step to deethanization so as to separate ethane and the lower boiling components from the $C_3$ hydrocarbons, treating the ethane and the lower boiling components to remove sulphur compounds and organic acid impurities, subjecting the so purified stream to hydrogenation to hydrogenate the acetylene in the stream to ethylene using the hydrogen obtained in the process, subjecting the stream after hydrogenation to fractionation to separate the ethylene as a substantially pure fraction from the ethane, and returning a portion of the ethane for the absorption of the methane from the predominantly hydrogen fraction.

References Cited in the file of this patent

UNITED STATES PATENTS

| | | |
|---|---|---|
| 2,315,424 | Hill et al. | Mar. 30, 1943 |
| 2,500,353 | Gantt | Mar. 14, 1950 |
| 2,689,624 | Davis | Sept. 21, 1954 |
| 2,815,650 | McIntire et al. | Dec. 10, 1957 |